United States Patent Office 3,448,251
Patented June 3, 1969

3,448,251
DEVICE FOR CLASSIFYING MEASURED
VALUES BY COUNTING
Gerhard Kaps, Hamburg-Lokstedt, and Winfried Schott, Garstedt, Germany, assignors, by mesne assignments, to U.S. Philips Corporation, New York, N.Y., a corporation of Delaware
Filed Oct. 8, 1965, Ser. No. 494,005
Claims priority, application Germany, Oct. 12, 1964, P 35,259
Int. Cl. G06g 7/14
U.S. Cl. 235—92       6 Claims

ABSTRACT OF THE DISCLOSURE

Apparatus for determining whether the number of pulses in a pulse series is between predetermined upper and lower limits using a divider with a signal adjustable division ratio, an adder connected to the output of the divider and a feedback circuit between the counter and the divider to switch the divider to an alternate division ratio after a number of pulses representing the lower limit has been counted.

---

The invention relates to devices for classifying measured values by counting pulse series which are proportional to the measured values. Such devices may be used to determine whether a dimension of an object is within specified tolerances. The length of such objects may be divided into discrete equidistant distances hereinafter called "classes." The number of entire classes representative of the dimension is the "class location." The class location is also the lower limit of tolerance of the dimension. The number of pulses representing the difference between the upper limit of tolerance and the class location will hereinafter be called the "class width."

Devices which perform the said task are known. They consist inter alia of a pre-selection counter for adjusting the class location, a divider with switchable division factor for choosing the class width, and a classifying counter.

The operation of such devices will be described in greater detail with reference to FIG. 1: the pulses of the pulse series to be classified supplied to the input E is applied for counting to the counter $Z_1$, the condition of which is continuously detected by the decoding device $D_1$. After a number of input pulses (class location) determined by the switch S, the gate G is opened. The remaining pulses of the series reach the divider $Z_3$ which divides the number thereof by a previously chosen number corresponding to the class width. Every output pulse of the divider $Z_3$ steps up the subsequent classifying counter $Z_2$ by one location (class). The contents of the counter $Z_2$ are detected by the decoding device $D_2$. After completion of a classifying operation the output $A_1$ of the decoding device $D_2$ corresponding to the class is marked. Before the beginning of the next classifying operation all the counters, the division stage and the gate are reset in the initial condition in response to a reset pulse at input $E_{EK}$.

A drawback of these known devices is that they are comparatively complicated and consequently expensive. In order to be able to distinguish $z_2$ different classes with a maximum width of $z_{3\ max}$ and to adjust a maximum class location $z_{1\ max}$, a counting capacity of $$z_{1\ max} \cdot z_{3\ max} \cdot z_2$$

is required. The maximum number of pulses of a series which can be handled in the said device is only $$z_{E\ max} = z_{1\ max} + z_{3\ max} + z_2$$

that is to say, the available counting capacity is used only partially.

It is the object of the invention to provide a simpler and cheaper device which uses the counting capacity as completely as possible. In a device according to the invention for classifying measured values by means of counting this is achieved in that only one repeatedly used counting device and switching means for automatically switching the counting device to at least two modes of operation are provided.

In order that the invention may readily be carried into effect it will now be described in greater detail, by way of example, with reference to the accompanying drawing in which FIG. 1 is the block diagram of a known classifying device.

Figure 1:
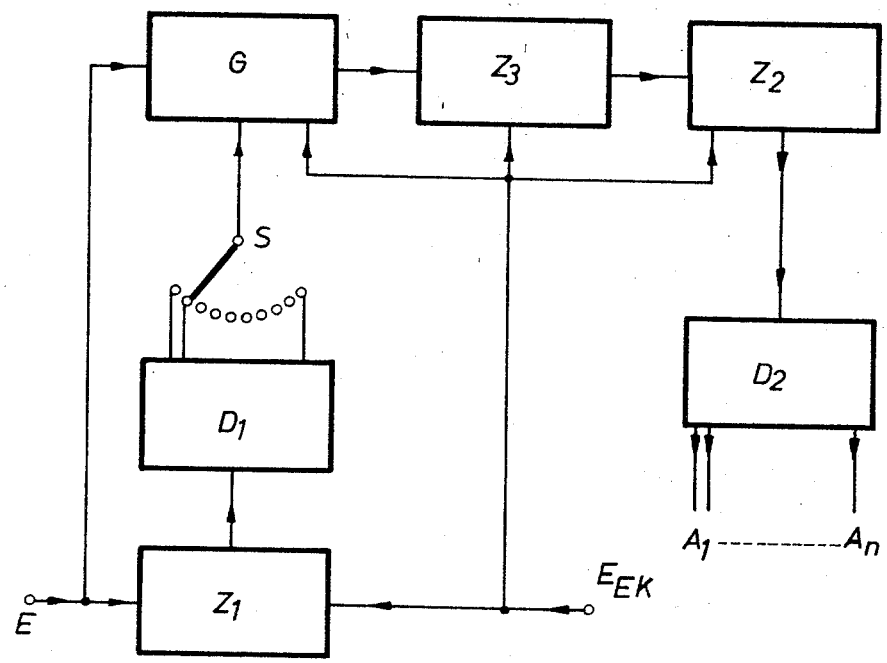
Figure 2:
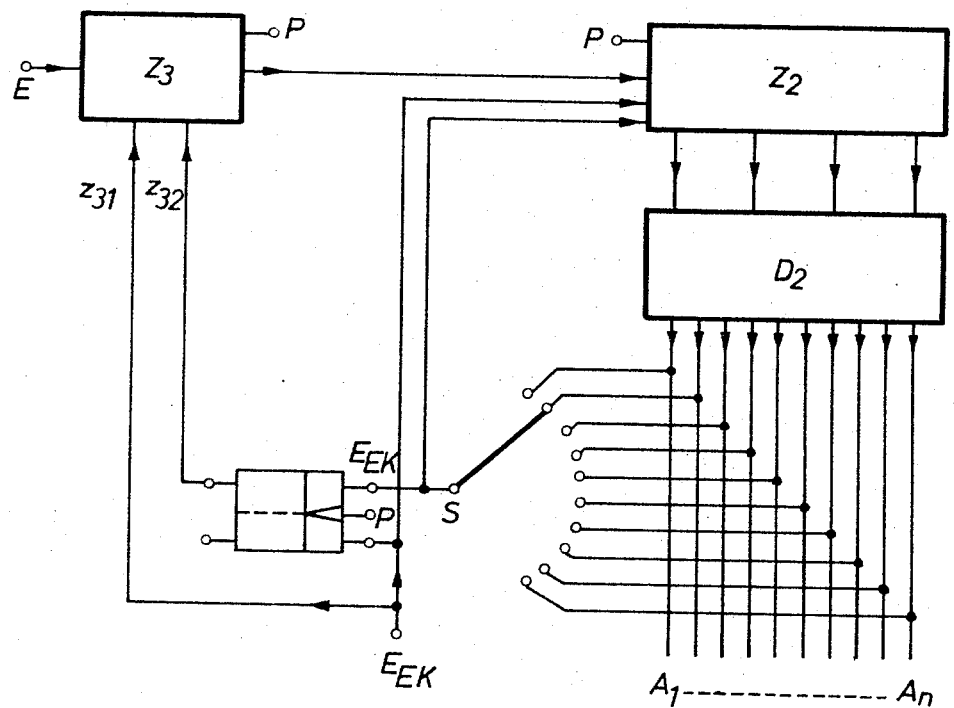
FIG. 2 is the block diagram of a classifying device with double use of the counting capacity according to the invention.

FIG. 2 shows the block diagram of a classifying device in which the counting capacity of the division stage $Z_3$ and of the counter $Z_2$ is used twice. At the beginning of the classifying operation the division stage $Z_3$ is adjusted to a division factor $Z_{31}$. The pulses of the pulse series to be classified are presented to the input E. Each time after $z_{31}$ input pulses, the counter $Z_2$ is stepped up by one location. When a counter condition $Z_{2K}$ corresponding to the class location is reached, which condition is detected by the decoding device $D_2$ and can be previously chosen by means of the switch S, the counter $Z_2$ is reset to the zero condition, while by means of a switching device the division factor of the divider $Z_3$ is switched from $z_{31}$ to $z_{32}$. $z_{32}$ is an adjustable division factor which determines the class width. As a result of this the counter $Z_2$ is stepped up by one location each time after $z_{32}$ input pulses. Now a class is associated with each location of the counter $Z_2$. At the end of the classifying operation the output of the decoding device $D_2$ associated with the counter $Z_2$, which output corresponds to the class reached, is marked. Before the next classifying operation the divider, the counter and the switching device are reset to the rest condition by a pulse presented to the input $E_{EK}$.

In this device the maximum class location is obtained from the product $z_{3\,max} \cdot z_{2\,max}$; the maximum number of classes and the maximum class width are identical to the maximum counting capacities $z_{2\,max}$ and $z_{3\,max}$ respectively. The maximum number of pulses of a series which can be handled in the device is twice the available counting capacity $z_{3\,max} \cdot z_{2\,max}$.

Figure 3:
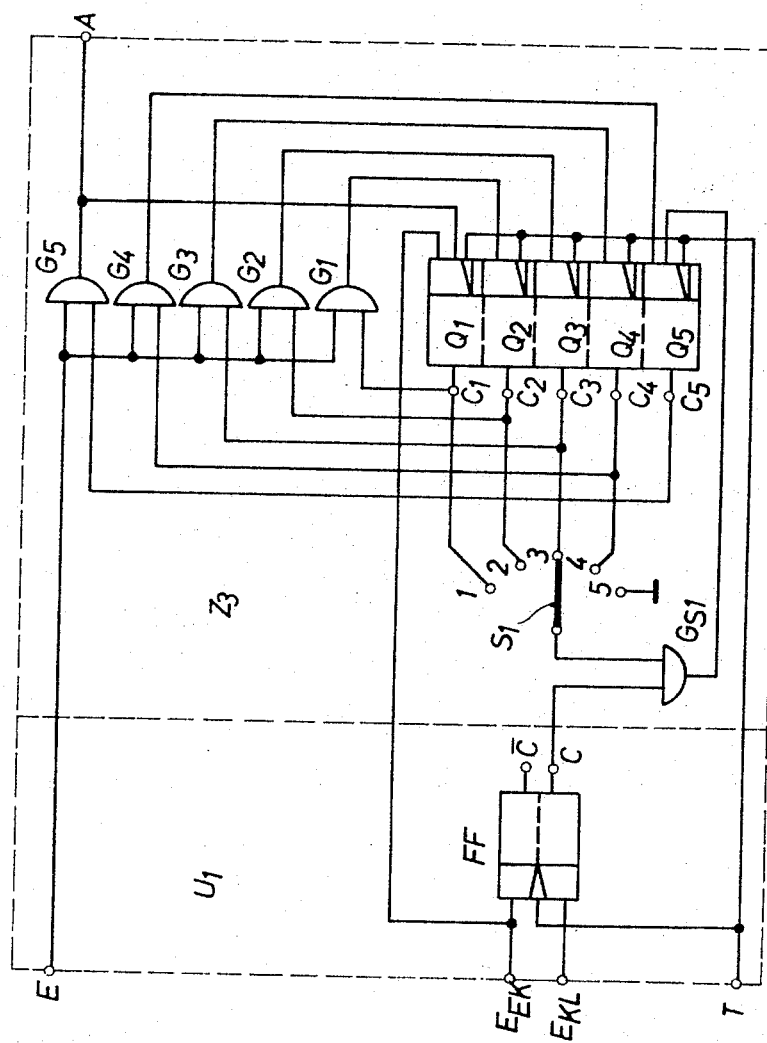
FIG. 3 shows an embodiment of a switchable division stage.

FIG. 3 shows an embodiment constructed to perform the synchronous counting technique of the divider $Z_3$ with switchable division factor and the associated switching device $U_1$ for the two modes in which the device can operate. The switching device $U_1$ consists of a bistable trigger stage FF; the divider $Z_3$ in this embodiment is formed by a trigger stage ($Q_1 \ldots Q_5$) with five stable conditions and by the AND-gates $G_1 \ldots G_5$ which connect the switched condition of the five-stable stage to the classifying pulses presented to the input E.

Before the beginning of a classifying operation the outputs $\overline{C}$ of the bistable trigger stage FF and $C_1$ of five-stable stage $Q_1 \ldots Q_5$ are reset. Thus the AND-gate $G_{S1}$ is blocked, as a result of which the position of the switch $S_1$ has no influence. In addition the AND-gate $G_1$ is prepared. The first classifying pulse reaches the preparation input of the quinary switching stage $Q_2$ through $G_1$ and causes the five-stable trigger stage to be switched by the clock pulse applied to the input T. The output $C_2$ is marked.

After the fourth classifying pulse the output $C_5$ obtains 1-potential and the fifth classifying pulse reaches the preparation input of the switching stage $Q_1$ and the transmission output A of the divider through the AND-gate $G_5$, that is to say, the division factor is $z_{31}=5$.

As a result of 1-potential at the preparation input $E_{KL}$ of the bistable trigger stage FF the reaching of the class location results in the output C of the said trigger stage to be marked and thus the AND-gate $G_{S1}$ to be prepared. Since the previously adjusted class location can be reached only by a transmission pulse of the divider, the output $C_1$ of the five-stable stage is simultaneously marked and the AND-gate $G_1$ prepared. After another two classifying pulses 1-potential appears at the output $C_3$ of the five-stable stage. This 1-potential, in the condition of the switch shown, reaches a second preparation input of the switching stage $Q_5$ through the AND-gate $G_{S1}$, so that the said stage can be marked by the following clock pulse and already the third classifying pulse can appear at the transmission output A through the AND-gate $G_5$ prepared for this purpose, that is to say, the division factor of the divider in this mode of operation and in the position of the switch chosen is $z_{32}=3$.

The division factor $z_{31}$ during the mode of operation "class location" in this special example is fixed and is determined by the counting capacity of the divider. If required, it may be made adjustable just like the division factor $z_{32}$ by a second switch and an AND-gate which is prepared in a corresponding manner by the output $\overline{C}$ of the bistable trigger stage (not shown).

Figure 4:
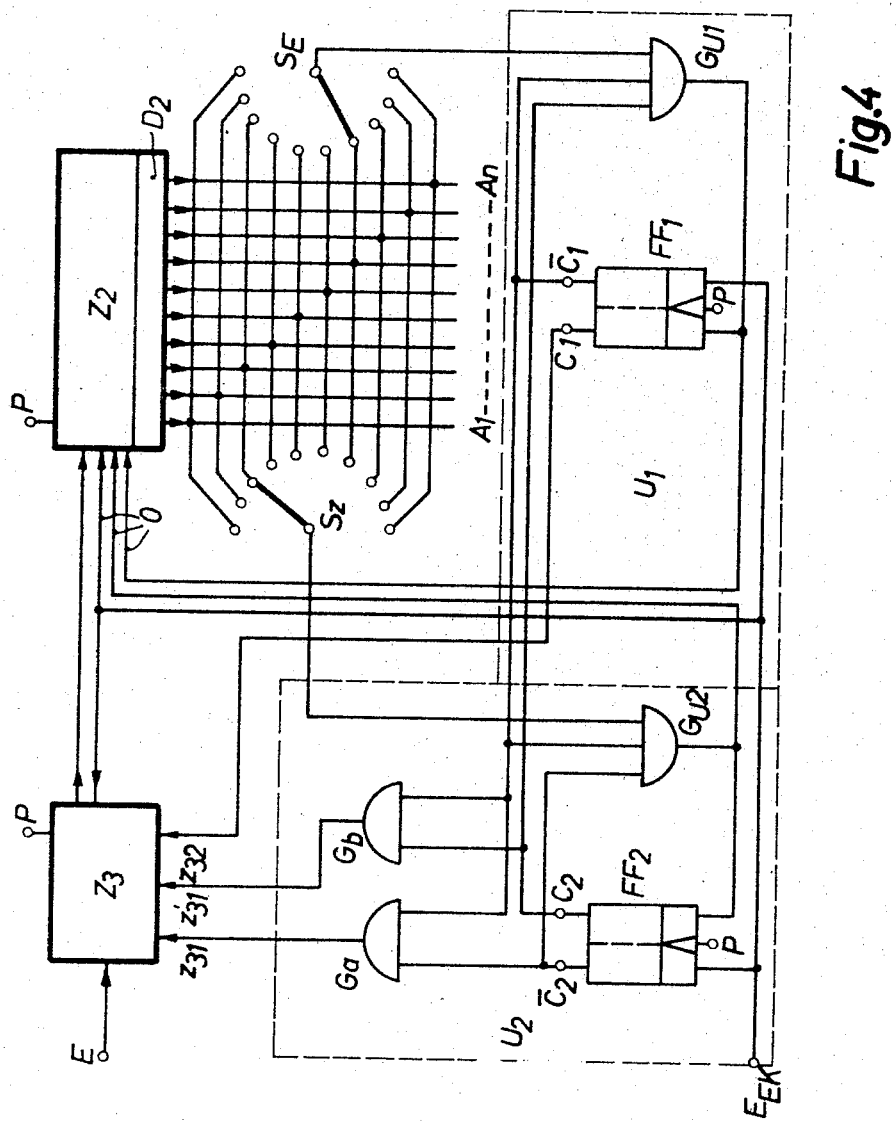
FIG. 4 shows an embodiment of a classifying device with multiple use of the counting capacity and a device for switching an adjustment of the class location in coarse steps to an adjustment in fine steps and conversely (block diagram).

The division in steps of the adjustment of the class location in the device described is given by the division factor $z_{31}$ and the maximum class location by the product $z_{31} \cdot z_{32\,max}$. The larger the required value of the class location, the coarser becomes the division in steps of the adjustment of that location at a given counting capacity $z_2$. To enable an adjustment in fine steps in case of large values for the class location, according to the invention a second switching device $U_2$ is provided which switches the division in the mode of operation "class location" from "coarse" to "fine" in those cases in which the following coarse step would exceed the previously adjusted value of the class location. The operation hereof is illustrated with reference to an embodiment (FIG. 4).

Before the beginning of a classifying operation the bistable trigger stages $FF_1$ and $FF_2$ show 1-potential at their outputs $\overline{C}_1$ and $\overline{C}_2$ respectively. All P-terminals are connected to the common clock pulse line. The divider $Z_3$ as a result is switched to the division factor $z_{31}$ through the AND-gate $G_a$ and the AND-gate $G_{u2}$ is prepared. After $z_{31} \cdot z_{2Z}$ input pulses the counting condition of the counter $Z_2$ has reached the value $z_{2Z}$ chosen previously by means of the switch $S_Z$.

As a result of this the bistable trigger stage $FF_2$ is prepared through the AND-gate $G_{u2}$ and switched by the clock pulse; the counter $Z_2$ is set to "zero." The output $C_2$ which has 1-potential after switching prepares the AND-gate $G_{u1}$ and switches the division factor of the counter $Z_3$ through the AND-gate $G_B$ to $z'_{31}$. In addition the AND-gate $G_{u2}$ is blocked.

After another $z'_{31} \cdot z_{2E}$ classifying pulses the counter $Z_2$ has reached the digit $z_{2E}$ chosen previously by means of the switch $S_E$, so that the bistable trigger stage $FF_1$ which is prepared through the AND-gate $G_{u1}$ is switched by the clock pulse and the counter $Z_2$ is reset to zero. As a result of the switching of the bistable trigger stage $FF_1$ the gates $G_a$, $G_b$, $G_{u1}$ and $G_{u2}$ are blocked, while the divider $Z_3$ is switched to the division factor $z_{32}$ corresponding to the class width. The subsequent classification runs off as in hte device shown in FIG. 2.

As a result of the positions $z_{2Z}$ and $z_{2E}$ of the switches $S_Z$ and $S_E$ and the division ratios $z_{31}$ and $z'_{31}$ the value $z_{KL}$ of the class location becomes:

$$z_{KL}=z_{31} \cdot z_{2Z}+z'_{31} \cdot z_{2E}$$

When in a special case $z_{31}=10$ and $z'_{31}=1$ is chosen, for example, the tens location of the class location value $z_{KL}$ can be adjusted by means of the switch $S_Z$ and the units location of the class location value $z_{KL}$ can be adjusted for example by means of the switch $S_E$.

Figure 5:
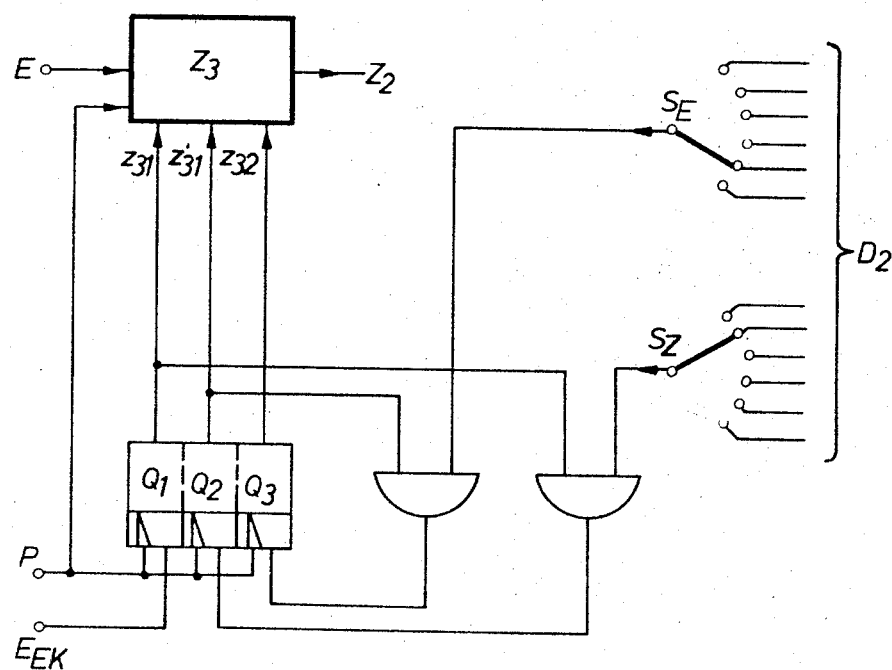
FIG. 5 is an embodiment of a device for switching to one of the modes of operation "class location coarse," "class location fine" and "classifying."

Instead of the two bistable trigger stages $FF_1$ and $FF_2$ a tristable trigger stage $Q_1 \ldots Q_3$ may advantageously be chosen as shown in FIG. 5, the three switching conditions of the said stage corresponding to the three modes of operation "class location coarse," "class location fine" and "classifying," which stage is efficaciously controlled by the switches $S_Z$ and $S_E$ through the two AND-gates which determine the sequence in time of the operating conditions.

What is claimed is:

1. Apparatus for determining whether the number of pulses in a pulse series is between a predetermined upper limit and a predetermined lower limit, comprising an adjustable pulse divider means having an input terminal for receiving said pulse series, an output terminal for providing $n/m$ output pulses for each $n$ pulses of said pulse series where $m$ is a division ratio of said divider means, said divider means including signal responsive switching means for changing said division ratio from $m$ to an alternate value; digital counter means connected to said output terminal of said divider, and feedback means responsive to the output of said digital counter means and coupled to said signal responsive switching means for providing a division ratio switching signal in response to a sum in said digital counter means corresponding to said predetermined lower limit.

2. Apparatus as claimed in claim 1, wherein said feedback means comprises switch means connected to said digital counter for setting said feedback means to said predetermined lower limit, and a bistable element connected to said switch means and said signal responsive switching means for providing said division ratio switching signal.

3. Apparatus as claimed in claim 1 wherein said divider means comprises a ring counter including at least three stages, and signal operable shunt means connected across at least one stage of said ring counter and connected to said feedback means for bypassing said stage of said ring counter in response to said division ratio switching signal.

4. Apparatus as claimed in claim 1 further comprising a second feedback means responsive to the output of said digital counter means and coupled to said signal responsive switching means for providing a further division ratio switching signal in response to a further predetermined sum in said digital counter intermediate said predetermined upper and lower limits.

5. Apparatus as claimed in claim 4 wherein said first feedback means and said second feedback means include a common tristable element.

6. Apparatus for determining whether the number of pulses in a pulse series between a predetermined upper limit and a predetermined lower limit, comprising ring counter having an input terminal for receiving said pulse series, an output terminal for providing $n/m$ output pulses for each $n$ pulses of said pulse series where $m$ is the number of active stages in said ring counter; a digital counter connected to the output terminal of said ring counter; a bistable element; switch means connected to said bistable element and to said digital counter for triggering said bistable element in response to a sum in said counter corresponding to said predetermined lower limit; and shunt means connected to said bistable element and connected across a stage of said ring counter for bypassing said ring counter stage in response to said triggering of said bistable element.

References Cited

UNITED STATES PATENTS

| 3,272,970 | 9/1966 | Laycak | 235—92 |
| 3,337,722 | 8/1967 | Siess | 235—92 |

MAYNARD R. WILBUR, *Primary Examiner.*

GREGORY J. MAIER, *Assistant Examiner.*